Nov. 9, 1965    K. JOEL    3,216,249
DIFFERENTIAL PRESSURE RESPONSIVE SIGNAL CIRCUIT
Filed May 18, 1961
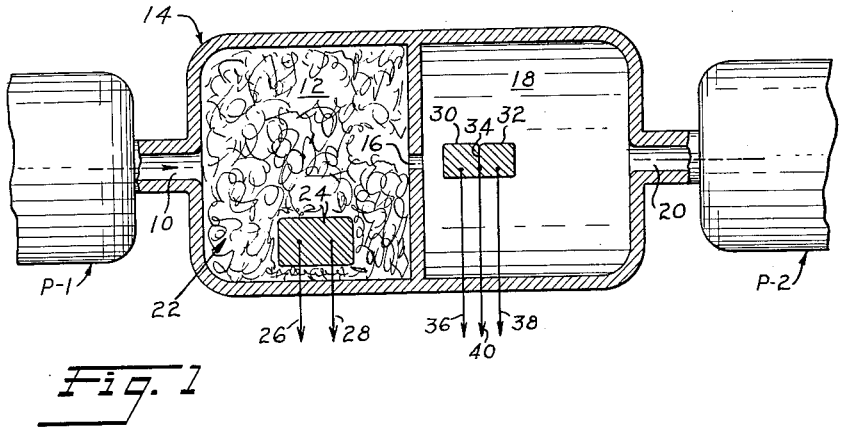
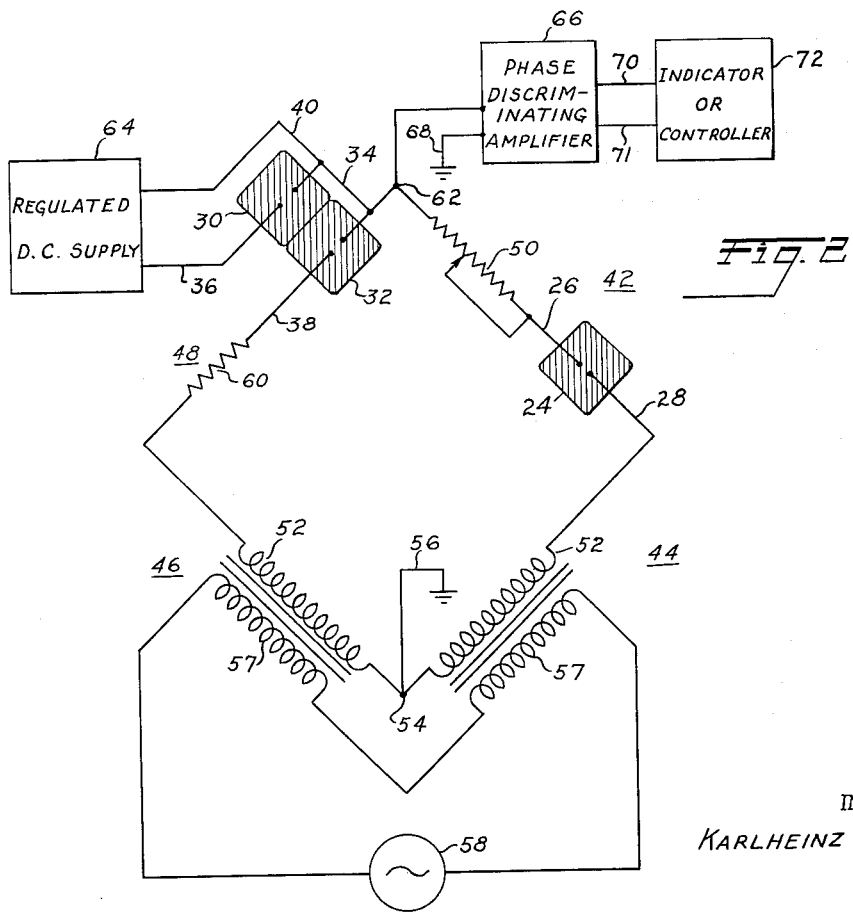
INVENTOR
KARLHEINZ JOËL
BY *Scrivener & Parker*
ATTORNEYS United States Patent Office 3,216,249
Patented Nov. 9, 1965

3,216,249
DIFFERENTIAL PRESSURE RESPONSIVE
SIGNAL CIRCUIT
Karlheinz Joel, Dallas, Tex., assignor, by mesne assignments, to Johnson Service Company, Milwaukee, Wis., a corporation of Wisconsin
Filed May 18, 1961, Ser. No. 110,988
5 Claims. (Cl. 73—204)

This invention relates to means for producing an electrical output signal which is proportional to the differential pressure between two pressure sources and more particularly, to means incorporating thermistors as the differential pressure detecting means.

One of the most desirable methods of detecting the absolute amount of differential pressure and/or the variations therein between two pressure sources is to detect the fixed or varying rate of flow of the pressure fluid through a calibrated orifice which is in common communication therebetween.

It is therefore, an object of this invention to provide a differential pressure detecting means which produces an output signal proportional to the rate of flow of pressure fluid through a calibrated orifice which is connected between a pair of pressure sources.

Another object of this invention is to provide a differential pressure detecting means which produces an output signal proportional to the rate of flow of pressure fluid through a calibrated orifice which is connected between a pair of pressure sources wherein the detecting element or elements comprise thermistors.

Still another object of this invention is to provide a differential pressure detecting means incorporating thermistors therein as the detecting elements and an alternating current bridge circuit including said thermistors for generating an output signal as a function of the rate of flow of pressure fluid through a calibrated orifice which is connected between a pair of pressure sources.

Still another object of this invention is to provide means in combination with the above enumerated means in the foregoing object whereby the output signal from the bridge or detector circuit may be utilized to energize an indicator and/or an automatic control means which would vary the pressure in one or both of the pair of pressure sources to control the desired pressure differential therebetween.

These and other objects of the invention will become apparent with reference to the following specification and drawings which relate to a preferred embodiment of the invention.

In the drawings:
FIGURE 1 is a schematic representation of the positional relationships of the calibrated orifice and the detecting means; and
FIGURE 2 is a circuit diagram of the invention.

One of the basic concepts of this invention is that if a thermistor, which maintained at a fixed bias, is placed in line with the flow of pressure fluid through a calibrated orifice under temperature controlled or thermally stable ambient conditions, the flow of pressure fluid will effect a heat exchange with the thermistor thereby reducing the temperature and the electrical resistance thereof in proportion to the magnitude of the rate of flow. Thus, by placing the thermistor in a calibrated circuit which is balanced for a predetermined pressure differential between the pair of pressure sources on opposite sides of the orifice, any variation from the desired setting will cause an unbalance therein and an output signal may be derived for indication or control purposes which is some measurable function of the change in the differential pressure being monitored.

Referring in detail to the drawings, and more particularly to FIGURE 1, a first pressure source P–1 is shown connected to an inlet 10 of a first chamber 12 in a sealed outer housing 14.

In the inner wall of the first chamber 12 is located a calibrated orifice 16 which interconnects the first chamber 12 with a second chamber 18 having an outlet port 20 in the outer wall thereof connected to a second pressure source P–2. The second pressure source P–2 provides a reference pressure for the purpose of detecting variations in the pressure from the first pressure source P–1.

The first chamber is filled with fibrous material 22 such as cotton or glass wool to provide a media through which pressure fluid, gas in this example, may flow and which will also provide a thermally stable environment. A first thermistor 24 for compensating the system, in a manner hereinafter described, against changes in ambient temperature and the temperature of the pressure fluid is embedded in the fibrous material 22. A pair of electrical leads 26 and 28 extend from the first thermistor 24 to the exterior of the sealed housing 12.

A pair of thermistor elements 30 and 32 which are physically and electrically connected back-to-back by a common central solder connection or the like 34 to comprise a second thermistor, are mounted in the second chamber 18 adjacent the calibrated orifice 16 in line with the flow of pressure fluid therethrough. The thermistors 30 and 32 have output leads 36 and 38, respectively, with a central or common lead 40 connected to the common solder connection 34. All of the connecting leads including those extending from the first thermistor 24 in the first chamber 12 are sealed into the closed housing 14.

Referring now, to FIGURE 2, the differential pressure monitoring circuit is shown to comprise an impedance bridge of the alternating current type having four bridge arms 42, 44, 46 and 48.

The arm 42 includes the first thermistor 24 and the connecting leads 26 and 28 thereof in series with an adjustable variable resistance element 50.

The arm 44 comprises one-half of a center tapped secondary winding 52 having the center tap or junction 54 thereof connected to ground at 56. The arm 46 comprises the other half of the secondary winding 52. A primary winding 57 feeds the secondary winding 52 from an alternating current source 58.

The bridge arm 48 comprises a fixed resistance 60 in series with one thermistor 32, of the composite or second thermistor in the second chamber 18 as shown in FIGURE 1, through the lead 38. The arm 48 is connected to the arm 42 at a point electrically equivalent to the common junction 34 of the composite thermistor 30–32. This junction is also enumerated as 62 in FIGURE 2. From this junction point 62 the common lead 40 of the composite thermistor 30–32 is connected to one terminal of a regulated direct current power supply 64. The other terminal of the D.C. supply 64 is connected to the lead 36 of the other or biasing thermistor 30 of the composite thermistor 30–32 whereby the thermistor 30 provides a calibrated thermal bias for the thermistor 32 physically and electrically connected thereto.

The unbalance signal detecting means 66 is connected between the junction 62 and a ground connection 68 whereby a diagonal connection across the two grounded junctions 54 and 62 of the bridge is effected. The means 66 in this instance is shown as being a phase-discriminating amplifier having its output connected lines 70 and 71 to an indicating or control circuit 72.

*Operation*

The bridge circuit of FIGURE 2 is first adjusted to a desired null point corresponding to the desired pressure differential between the pressure sources P–1 and P–2 by varying the value of the resistor 50 in the bridge arm 42. An automatic adjustment in the same bridge arm to compensate for ambient temperature conditions is effected by the first thermistor 24 which either increases or decreases the resistance in series with the variable resistor 50 to maintain the proper null point or reference setting in the bridge arm 42.

Referring to FIGURES 1 and 2, the reference pressure source P–2 is maintained at a pressure having a magnitude less than the pressure in the source P–1 by a predetermined amount. The setting of the resistor 50 in the bridge arm 42 corresponds to this initial predetermined pressure differential.

The pressure differential acts to create a flow of pressure fluid from the source P–1 through inlet 10, first chamber 12 and the fibrous material 22 therein and in thermal contact with the first thermistor 24, through the calibrated orifice 16, against the face of the biasing thermistor 30 of the composite thermistor 30–32 in the second chamber 18 and through the outlet port 20 therein to the second or reference pressure source P–2.

The initial series resistance of the thermistor 32 of the composite thermistor 30–32 in the bridge arm 48 is determined by the temperature of the biasing thermistor 30 which has a predetermined value corresponding to the magnitude of the regulated direct current bias supplied thereto by the D.C. supply 64.

The magnitude of the flow of pressure fluid through the calibrated orifice 16 is proportional to the pressure differential between the pressure sources P–1 and P–2 and in impinging on the face of the biasing thermistor 30, the pressure fluid acts as a heat exchange medium which reduces the temperature of the biasing thermistor 30 in proportion to the rate of flow of the pressure fluid. This temperature change is reflected as a change in the series resistance of the thermistor 32 in the bridge arm 48, in proportion to the temperature change in the biasing thermistor 30 which is in thermal and electrical contact therewith by way of the common solder junction 34.

The change is resistance of the thermistor 32 in the bridge arm 48 causes the bridge circuit to unbalance. The resulting unbalance signal appears between the diagonally disposed junction 54, which is at ground potential, and junction 62, the phase of the unbalance signal being determined by the direction of the variation of desired pressure differential between the pressure sources P–1 and P–2 either above or below the predetermined null value. The output at junction 62, referenced to ground terminals 54 and 62, is amplified by a phase discriminating amplifier 66 and an output signal is fed therefrom through lines 70 and 71 to the indicating or control means 72.

As can be seen from the foregoing specification and drawings, this invention provides a novel and relatively simple means for continuously monitoring variations in the pressure differential between a pair of pressure sources and providing an output signal proportional to the variation whereby the variation may be indicated and/or automatically corrected.

It is to be understood that the embodiment shown and described herein is for the purpose of example only and is not intended to limit the scope of the appended claims.

I claim:

1. A system for providing an output response upon variation in the rate of flow of a fluid from a predetermined rate of flow, comprising a resistance sensing element having a relatively high temperature coefficient positioned to have the flowing fluid impinge thereon whereby the resistance of the element varies with the rate of flow, an electrical circuit including input means to supply a signal current to said element and being operable to produce a null output response at a predetermined resistance of said element and to produce an output response proportional to variation of the resistance of said element from the predetermined value, and a preset constant input heat source including a thermistor and an adjustable power supply connected to continuously supply bias current to the thermistor separate from the current through the element and from the fluid for supplying a preselected amount of heat to said element to bias it to a predetermined temperature, and circuit means connected to the electrical circuit to detect said output response in the presence of the signal current through the sensing element and the preset bias current flow from said adjustable power supply to the thermistor and the fluid flowing over the sensing element.

2. A system for indicating the pressure differential between reference and variable sources of fluid pressure in two chambers which are separated by means having an orifice therein communicating with the two chambers, comprising a pair of thermistors having a relatively high temperature coefficient disposed on each in each chamber, the thermistor in the variable pressure chamber being spaced laterally of the orifice and the thermistor in the reference pressure chamber being positioned in alignment with the orifice to be exposed to the flow of pressure fluid from the variable pressure chamber through said orifice whereby the temperature and resistance of the thermistor vary in accordance with the rate of flow through the orifice, a separate heating means including a bias thermistor in physical contact with the thermistor in the reference pressure chamber for supplying heat to said corresponding thermistor to produce a resistance having a predetermined relation to a desired pressure differential between the two chambers, and means connected to said elements for indicating changes in the resistance of the element in the reference pressure chamber due to variations in the rate of fluid flow through the orifice.

3. A flow sensing thermistor unit adapted to be connected in a detecting circuit for determining fluid flow, comprising a sensing thermistor for mounting within the fluid flow and having input means for connection in the detecting circuit and controlling the output thereof in accordance with the fluid flow, a biasing thermistor corresponding to the sensing thermistor and having input means for connection to a power source to be heated by current flow therethrough independent of the detecting circuit to an operation temperature above the ambient temperature of the fluid, and means to physically and directly connect the biasing thermistor to the sensing thermistor for heating the sensing thermistor to a selected operating temperature.

4. The flow sensing thermistor unit of claim 3 wherein the sensing and biasing thermistors are small rectangular members integrally connected to each other along a common wall portion.

5. The system of claim 1 wherein said input means is an alternating current source means and said heat source means includes a regulated direct current supply connected to said biasing thermistor.

References Cited by the Examiner

UNITED STATES PATENTS

| | | | |
|---|---|---|---|
| 2,214,181 | 9/40 | Rylsky | 73—204 |
| 2,379,293 | 6/45 | Goddard | 73—179 |
| 2,509,889 | 5/50 | Shockley | 73—204 |
| 2,517,628 | 8/50 | Bottoms | 73—362 |
| 2,533,286 | 12/50 | Schmitt | 73—362 X |
| 2,859,617 | 11/58 | Adams | 73—204 |
| 2,947,938 | 8/60 | Bennett | 73—204 X |
| 3,085,431 | 4/63 | Yerman et al. | 73—204 |

RICHARD C. QUEISSER, *Primary Examiner.*

ROBERT L. EVANS, DAVID SCHONBERG,

*Examiners.*

UNITED STATES PATENT OFFICE
CERTIFICATE OF CORRECTION

Patent No. 3,216,249                                             November 9, 1965

Karlheinz Joel

It is hereby certified that error appears in the above numbered patent requiring correction and that the said Letters Patent should read as corrected below.

Column 3, line 41, for "is" read -- in --; column 4, line 17, for "on" read -- one --.

Signed and sealed this 19th day of July 1966.

(SEAL)
Attest:

ERNEST W. SWIDER
Attesting Officer

EDWARD J. BRENNER
Commissioner of Patents